United States Patent [19]

Yee

[11] 4,351,162

[45] Sep. 28, 1982

[54] APPARATUS FOR ENGINE COOLING AND VEHICLE AIR CONDITIONING

[75] Inventor: Clifford S. L. Yee, Indianapolis, Ind.

[73] Assignee: Wallace Murray Corp., Indianapolis, Ind.

[21] Appl. No.: 192,893

[22] Filed: Oct. 1, 1980

[51] Int. Cl.³ .......................................... B60H 3/04
[52] U.S. Cl. ........................................ 62/239; 62/244
[58] Field of Search ................ 62/239, 243, 244, 428

[56] References Cited

U.S. PATENT DOCUMENTS

| | | | |
|---|---|---|---|
| 1,072,894 | 9/1913 | Worthington | |
| 2,336,089 | 12/1943 | Gould | 62/244 X |
| 2,742,765 | 4/1956 | Anderson | 62/244 X |
| 2,761,293 | 9/1956 | Eubank | |
| 2,957,317 | 10/1960 | Parker | 62/239 X |
| 3,022,644 | 2/1962 | Grenier | 62/243 |
| 3,203,499 | 8/1965 | Bentz et al. | 180/68 |
| 3,286,765 | 11/1966 | Jentet | 165/2 |
| 3,306,067 | 2/1967 | Anglin | 62/244 X |
| 3,411,316 | 11/1968 | Wright | 62/239 |
| 3,606,762 | 9/1971 | Anglin et al. | 62/239 X |
| 3,844,130 | 10/1974 | Wahnish | 62/244 X |
| 4,138,857 | 2/1979 | Dankowski | 62/239 |

*Primary Examiner*—Lloyd L. King
*Attorney, Agent, or Firm*—Woodard, Weikart, Emhardt & Naughton

[57] ABSTRACT

An apparatus for cooling a vehicle engine and for air conditioning the vehicle is disclosed herein which includes a planar, liquid-coolant radiator parallel with and spaced apart from a planar condenser. A fan blade is mounted between and rotatable in a plane parallel with the radiator and the condenser, and an electric, pancake motor is mounted in the interior of and integral with the fan blade to rotate the fan blade to move air through the radiator and condenser.

14 Claims, 3 Drawing Figures

APPARATUS FOR ENGINE COOLING AND VEHICLE AIR CONDITIONING

BACKGROUND OF THE INVENTION

1. Field of the Invention

The present invention relates to apparatus for cooling a vehicle engine and for providing air conditioning to the vehicle.

2. Description of the Prior Art

Apparatus for cooling a vehicle engine and also providing air conditioning to the vehicle are well known in the prior art. A typical apparatus includes a radiator mounted at the front of the vehicle and connected to the engine to cool the liquid coolant with the air flow created by the combined effect of the forward motion of the vehicle and an engine-mounted radiator fan. In the typical air conditioning systems, there is included a refrigerant condenser which is mounted in front of the engine radiator and provides condensing of the refrigerant as a result of the air flow over the condenser. A purpose of many of the prior art devices has been to provide efficient and substantial air flow over the condenser and radiator in order to provide the required cooling. This is a particular problem under engine idling and high vehicle load conditions.

In U.S. Pat. No. 3,022,644, issued to Grenier on Feb. 27, 1962, there is disclosed an automobile air conditioner condenser. The Grenier condenser is generally U-shaped and is mounted about the periphery of an engine driven radiator fan. The radiator fan draws air axially through the radiator, and also provides a radially outward air flow which passes over the condenser. Another method and apparatus for air conditioning a vehicle is disclosed in U.S. Pat. No. 3,286,765, issued to Jentet on Nov. 22, 1966. The Jentet apparatus includes screens mounted on opposite sides of the engine and condenser to cause recirculation of the air flow back to the front of the condenser. In one embodiment of the Jentet device, a typical engine-mounted fan is utilized to provide the air flow, the fan being located behind the liquid-coolant radiator and the condenser. In an alternate embodiment the fan is mounted to an air-cooled engine between the condenser and the cylinder heads.

Some alternate configurations for a cooling system are also disclosed in the prior art. In U.S. Pat. No. 3,411,316, issued to Wright on Nov. 19, 1968, there is disclosed a cooling system in which the condenser comprises two condenser units located behind the radiator and spaced apart to expose a substantial portion of the radiator to the engine-mounted fan. A more elaborate system including a separate pre-cooling unit and fan is disclosed in U.S. Pat. No. 3,606,762, issued to Anglin et al. on Sept. 21, 1971. The pre-cooler is horizontally mounted between the vertical, spaced apart condenser and radiator, and a separate fan is mounted above the pre-cooler to force air downwardly through the pre-cooler and below the level of the condenser and radiator. In U.S. Pat. No. 3,203,499, issued to Bentz et al. on Aug. 31, 1965, there is disclosed a cooling arrangement for a supercharged engine. The Bentz et al. apparatus includes a usual radiator and also an intercooler which provides the cooled air to the engine intake manifold. Located between the radiator and the intercooler is a fan which is driven through mechanical linkage with the engine crankshaft.

The majority of the prior art devices include the described arrangement in which the condenser is mounted in front of the radiator, and the engine-mounted radiator fan is used to draw air through both of the units. Examples of this prior art are contained in U.S. Pat. Nos. 2,761,293, issued to Eubank on Sept. 4, 1956; and 1,072,894, issued to Worthington on Sept. 9, 1913. Comparable devices which also include an auxiliary fan mounted in front of the condenser are disclosed in U.S. Pat. Nos. 4,138,857, issued to Dankowski on Feb. 13, 1979; and 3,844,130, issued to Wahnish on Oct. 29, 1974.

SUMMARY OF THE INVENTION

In one aspect, the present invention provides an apparatus for cooling a vehicle engine and for air conditioning the vehicle, which apparatus includes a planar, liquid-coolant radiator and a planar condenser mounted in parallel, spaced apart relation. Between the radiator and the condenser, a fan blade is mounted to rotate in a parallel plane with them. Means for rotating the fan blade are provided to move air through the radiator and the condenser. In a particular aspect, the present invention includes an electric, pancake motor mounted in the interior of and integral with the fan blade, and mounted to either the radiator or the condenser.

It is an object of the present invention to provide an improved apparatus for cooling a vehicle engine, and in particular an improved means for moving air across a liquid-coolant radiator connected with the vehicle engine.

Another object of the present invention is to provide an improved apparatus for air conditioning a vehicle, and more particularly one which includes an improved method for moving air across the condenser unit of the air conditioner.

It is a further object of the present invention to provide air conditioning and engine cooling by means of a more efficient arrangement of a fan with the liquid-coolant radiator and the condenser.

Another object of the present invention is to provide air conditioning and engine cooling which is efficient and effective, and which requires a minimum of space within the vehicle.

A further object of the present invention is to provide air conditioning and engine cooling by the use of a fan which is simple and relatively inexpensive in construction, use and servicing, and which does not require mechanical coupling with the vehicle engine.

It is a further object of the present invention to provide air conditioning and engine cooling by means of a liquid-coolant radiator and a condenser which are of a standard construction, and which do not require the substantial shrouding of the fan used in connection therewith.

Another object of the present invention is to provide air conditioning and engine cooling which involves a substantial savings of space and of the usual prior art shrouding associated with engine-mounted fans, and which therefore can permit a reduced length for a vehicle at a considerable cost savings.

Further objects and advantages of the present invention will become apparant from the description of the preferred embodiment which follows.

DESCRIPTION OF THE PREFERRED EMBODIMENT

Figure 1:
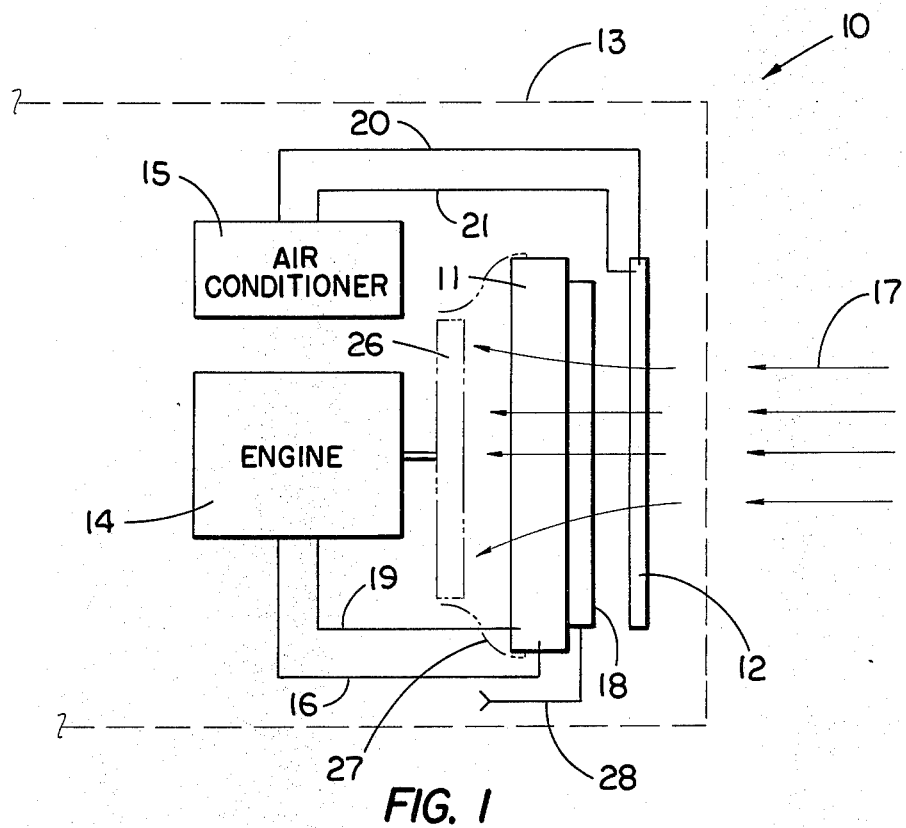
FIG. 1 is a schematic drawing showing the arrangement of the preferred embodiment for an apparatus constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The use of liquid-coolant radiators for engine cooling in vehicles, and the use of air conditioning units including condensers located adjacent the vehicle radiator are well known in the art. In a typical embodiment of the prior art, a fan blade is mounted to the vehicle engine and is surrounded by a shroud spanning from the fan blade to the rear of the radiator. When the engine is operating, the fan blade draws air through the radiator, and to a certain extent also through the condenser spaced in front of the radiator. The present invention provides an apparatus for cooling a vehicle engine and for air conditioning the vehicle which utilizes an efficient arrangement of the radiator, condenser and fan in distinct contrast to the prior art. Further, in a preferred embodiment the present apparatus includes an electric motor to drive the fan, which motor may be controlled independently of the vehicle engine to provide appropriate cooling for various conditions.

Referring in particular to FIG. 1, there is shown a schematic drawing of an apparatus constructed in accordance with the present invention. The apparatus 10 includes a radiator 11 and condenser 12 mounted in standard fashion within a vehicle 13. In the usual fashion, the radiator 11 is operatively connected with the vehicle engine 14 to operate as a heat exchanger for the liquid coolant of the engine. Similarly, the condenser 12 is operatively connected with the air conditioner 15 in usual fashion to operate as a heat exchanger for the refrigerant received from the compressor of the air conditioning unit.

Liquid coolant systems for vehicle engines have long been in use, and therefore will not be described in detail herein. Briefly, in a typical engine the liquid coolant is delivered by a pump to the cylinder block and then directed along the row of cylinders to a thermostat. The thermostat operates to control the flow of the coolant from the engine block to the radiator through line 16. At the radiator, a heat exchange occurs between the liquid coolant and the air flow 17 across the radiator created by the combined effect of the forward motion of the vehicle and the cooling fan 18. The liquid coolant exits the radiator at a reduced temperature and is pumped from line 19 to and through the vehicle engine. In a similar manner, the transmission fluid may also be passed through a portion of the radiator for cooling.

The use of air conditioning systems for vehicles is also well known, and will not be described in detail. Typically, the vehicle air conditioner 15 includes a compressor which discharges a high pressure refrigerant vapor through a line 20 to the heat exchanger known as a condenser 12. The air flow 17 across the condenser 12 provides a heat exchange with the refrigerant vapor which causes the vapor to condense. The liquid refrigerant passes from the condenser through a line 21 to a receiver which is in liquid communication with a thermostat expansion valve. The expansion valve controls the flow of the liquid refrigerant to an evaporator where a subsequent heat exchange occurs with the liquid refrigerant to provide cooling for the vehicle. As a result of this heat exchange, the liquid refrigerant is vaporized and is then supplied in the vapor state to the compressor to complete the refrigeration cycle.

Except as specifically indicated, the nature and construction of the vehicle engine and the air conditioner unit, apart from the inclusion of a radiator and condenser form no part of the present invention, and further details of such systems are therefore not provided. Various embodiments for such systems are well known and understood in the art. Typical examples of such systems are disclosed in U.S. Pat. Nos. 4,138,857, issued to Dankowski on Feb. 13, 1979; 3,844,130, issued to Wahnish on Oct. 29, 1974 and 2,761,293 issued to Eubank on Sept. 4, 1956, and the pertinent portions of these patents are incorporated herein by reference.

Figure 2:
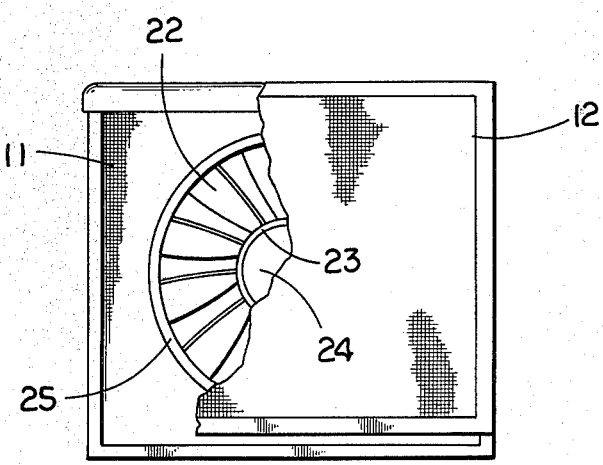
FIG. 2 is a front, partially broken view of the embodiment of FIG. 1.

In the prior art embodiments, the cooling fan was typically directly mounted to the engine, with some variations having been proposed as previously discussed. The present invention may or may not additionally include an engine-mounted cooling fan 26 and associated shroud 27, but does include a cooling fan mounted between the radiator and the condenser. For the present invention, the liquid-coolant radiator has a planar configuration. The condenser also has a planar configuration and is mounted substantially parallel with the radiator. The fan 18 includes a fan blade 22 (FIG. 2) which is mounted to rotate in a plane substantially parallel with the radiator and the condenser. Means are provided for mounting the fan blade between the radiator and the condenser, and rotation means are also provided for rotating the fan blade.

A particular aspect of the present invention is the spacing of the radiator and the condenser. Preferably the radiator and the condenser are spaced apart a distance of at most about twice the thickness of the radiator, and preferably no more than about the thickness of the radiator. It is also preferable that the fan blade have an axial depth greater than about one-half the distance between the radiator and the condenser, and most preferably greater than about three-fourths the distance between the radiator and the condenser. In this manner, the radiator and the condenser are positioned relatively close to one another, and the fan operates very efficiently to move air through both the radiator and the condenser.

The fan blade is mounted between the radiator and the condenser, and preferably is mounted to one or the other. In a particularly preferred embodiment, the fan includes an electric motor mounted inside of the fan blade, and the mounting of the fan blade is then accomplished by attachment of the motor to either the condenser or the radiator, preferably the radiator.

Rotation means for rotating the fan blade parallel to the radiator and the condenser is also provided. The rotating means may comprise any of a variety of means typically known in the art. However, it is preferred that the rotating means comprise an electric motor, rather than a mechanical coupling with the vehicle engine. Moreover, it is most preferred that the electric motor be substantially contained interiorly of the fan blade, whereby the motor does not significantly affect the efficiency of the fan or the desired placement of the radiator and condenser in close proximity to one another.

In the most preferred embodiment, the fan blade 22 includes an interior hub 23 and the electric motor connected to an electrical source through wires 28 is a pancake motor 24 mounted within the interior hub and integral with the fan blade. The construction of pancake motors and frameless D.C. motors are known and understood in the art, and are therefore not described in detail herein. Other examples of the design and construction of a pancake motor are contained in U.S. Pat. Nos. 3,549,928 issued to Knapp on Dec. 22, 1970; and 3,500,095, issued to Keogh on Mar. 10, 1970, the pertinent portions of which are incorporated herein by reference.

Figure 3:
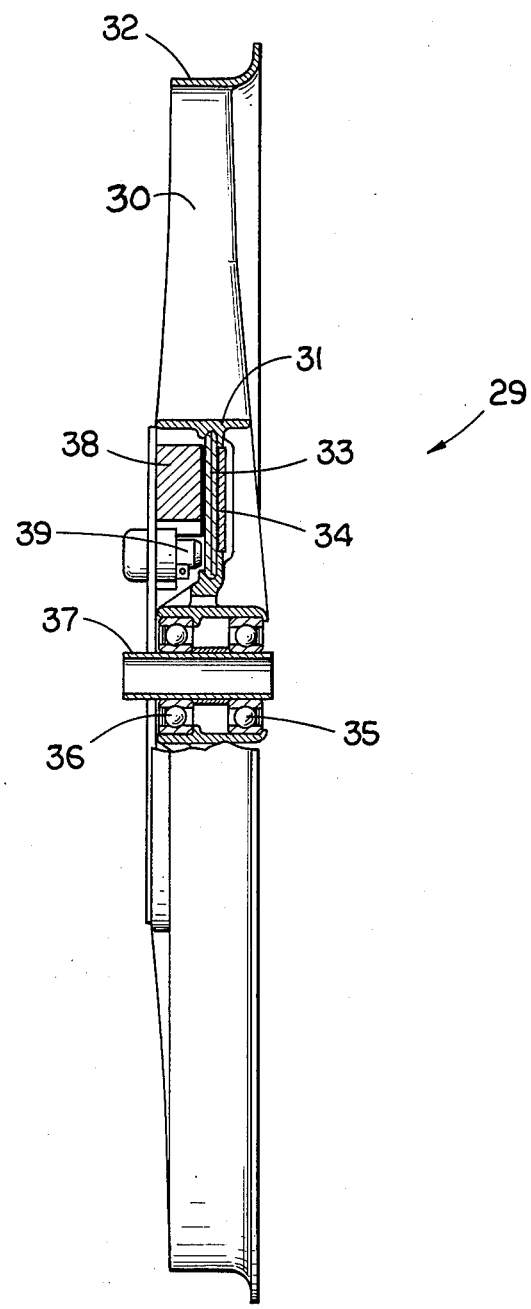
FIG. 3 is a side, partially cross-sectional view of a pancake motor and fan assembly.

Referring in particular to FIG. 3, there is shown a preferred embodiment of a pancake motor and fan assembly useful in the present invention. The fan assembly 29 includes several blades 30 extending from a hub 31 to an outer, encircling shroud 32. The pancake motor 20 includes an armature 33 and magnetic return circuit components 34 which are mounted with the hub 31 and are rotatable therewith around ball bearings 35 and 36. The inner races of the ball bearings 35 and 36 are received against a central mounting member 37. Secured to the mounting member 37 is the ferrite magnet ring 38 and also the holders and brushes 39. The pancake motor operates in the usual fashion of electric motors, and particularly pancake motors which will be well understood in the art. In accordance with this arrangement, a pancake motor and fan assembly is provided which may be readily attached in the manner described by mounting with the central mounting 37. Further, an assembly is provided which has the desired size and operational properties to produce a relatively thin and compact fan blade and motor assembly.

The close placement of the radiator and condenser fan contributes to the efficient operation of the cooling fan 18 in moving air through the radiator and the condenser. In addition, the apparatus may include a shroud surrounding the fan blade and extending between the radiator and the condenser. In a preferred embodiment, the shroud 25 (FIG. 2) is supported by and integral with the fan blade 22 and rotates with the fan blade. This construction is particularly desirable since it minimizes the mounting of the components, and also since the fan blade may then be molded as a one piece unit with the shroud and individual blades secured to the interior hub.

In accordance with the present invention, an efficient and effective apparatus is provided for the cooling of a vehicle engine and for air conditioning the vehicle. The placement of the cooling fan between the radiator and the condenser provides a more reliable and controllable flow of air across the two units. In addition, the use of an electric motor to drive the cooling fan rather than a direct coupling with the engine motor, enables an independent control of the fan separate from the engine to be more responsive to the cooling requirements for either or both of the radiator and condenser. The use of an electric motor is also desirable since it does not require a mechanical linkage with the engine, and is typically a more reliable and easily serviced arrangement than a mechanical linkage to the engine.

The invention requires a minimum of space within the engine compartment of a vehicle, and yet provides efficient cooling for the radiator and condenser. By the configuration and placement of the fan as described herein, the normal shrouding associated with prior art, engine mounted fans is made unnecessary. As a result, substantial savings in space within the engine compartment of a vehicle are realized. As a direct result, the overall length of the vehicle could be modified with significant cost savings being produced. The use of engine mounted fans in the prior art which were placed typically behind the radiator and required considerable shrouding to obtain the desired air flow represents a significant disadvantage of these prior art devices which is overcome by the present invention.

What is claimed is:

1. An apparatus for cooling a vehicle engine and for air conditioning the vehicle, which comprises:
    a planar liquid-coolant radiator mounted in the vehicle and operatively connected with the vehicle engine;
    a planar condenser with the air conditioning unit of the vehicle, said radiator and said condenser being in substantially parallel, spaced apart relation;
    a fan blade;
    mounting means for mounting said fan blade between said radiator and said condenser and rotatable in a plane substantially parallel with said radiator and said condenser, said mounting means further being for mounting said fan blade such that rotation of said fan blade in a first direction draws air directly from and through one of said radiator and said condensor and pushes air directly to and through the other of said radiator and said condensor; and
    rotation means for rotating said fan blade in the first direction to draw air directly from and through one of said radiator and condensor and to push air directly through the other of said radiator and said condenser.

2. The apparatus of claim 1 in which said radiator and said condenser are spaced apart a distance of at most about twice the thickness of said radiator.

3. The apparatus of claim 1 and which includes a shroud surrounding said fan blade.

4. The apparatus of claim 3 in which said shroud is supported by and integral with said fan blade and rotate with said fan blade.

5. The apparatus of claim 1 in which said rotation means comprises an electric motor.

6. The apparatus of claim 5 in which said fan blade includes an interior hub and the electric motor is a pancake motor mounted within the interior hub and integral with said fan blade.

7. The apparatus of claim 1 in which said fan blade has an axial depth greater than about one-half the distance between said radiator and said condenser.

8. The apparatus of claim 7 in which the axial depth of said fan blade is greater than about three-fourths the distance between said radiator and said condenser.

9. The apparatus of claim 7 in which said rotation means comprises an electric motor.

10. The apparatus of claim 9 in which the electric motor is substantially contained interiorly of said fan blade.

11. The apparatus of claim 10 in which said fan blade includes an interior hub and the electric motor is a pancake motor mounted within the interior hub and integral with said fan blade.

12. The apparatus of claim 11 in which said mounting means is for mounting the pancake motor to one of said radiator and said condenser.

13. The apparatus of claim 12 and which includes a shroud surrounding said fan blade.

14. The apparatus of claim 13 in which said shroud is supported by and integral with said fan blade and rotates with said fan blade.

* * * * *